(12) United States Patent
Suzuki et al.

(10) Patent No.: US 9,138,902 B2
(45) Date of Patent: Sep. 22, 2015

(54) ROBOT

(75) Inventors: Hidetoshi Suzuki, Kitakyushu (JP);
Ryuta Kagawa, Kitakyusu (JP);
Takashi Sanada, Kitakyushu (JP)

(73) Assignee: KABUSHIKI KAISHA YASKAWA DENKI, Kitakyushu-Shi, Fukuoka (JP)

(*) Notice: Subject to any disclaimer, the term of this patent is extended or adjusted under 35 U.S.C. 154(b) by 450 days.

(21) Appl. No.: 13/228,740

(22) Filed: Sep. 9, 2011

(65) Prior Publication Data

US 2012/0067157 A1    Mar. 22, 2012

(30) Foreign Application Priority Data

Sep. 16, 2010 (JP) ................................. 2010-208245

(51) Int. Cl.
*B25J 19/00* (2006.01)

(52) U.S. Cl.
CPC ........ *B25J 19/0025* (2013.01); *Y10T 74/20311* (2015.01); *Y10T 74/20317* (2015.01)

(58) Field of Classification Search
CPC .... B25J 19/00; B25J 19/0025; B25J 19/0029; B25J 17/0283
USPC ............... 74/490.01, 490.02, 490.04, 490.05, 74/490.06; 901/15, 28, 29
See application file for complete search history.

(56) References Cited

U.S. PATENT DOCUMENTS

| | | | | |
|---|---|---|---|---|
| 4,499,341 | A * | 2/1985 | Boyd ............................ | 191/12.4 |
| 4,529,352 | A * | 7/1985 | Suzuki et al. ................ | 414/680 |
| 4,721,005 | A * | 1/1988 | Yoshiji et al. ............... | 74/490.04 |
| 6,431,018 | B1 * | 8/2002 | Okada et al. ................ | 74/490.02 |
| 6,527,217 | B1 * | 3/2003 | Lyons ........................ | 242/423.2 |
| 6,684,731 | B1 | 2/2004 | Karlinger | |
| 6,811,124 | B2 * | 11/2004 | Karlinger ........................ | 248/49 |
| 6,991,627 | B2 * | 1/2006 | Madhani et al. .................. | 606/1 |
| 7,105,771 | B2 * | 9/2006 | Inoue et al. ................ | 219/125.1 |
| 7,173,213 | B2 * | 2/2007 | Inoue et al. ................ | 219/125.1 |
| 7,241,969 | B2 * | 7/2007 | Inoue et al. ................ | 219/125.1 |
| 8,001,868 | B2 * | 8/2011 | Palau et al. ................ | 74/490.05 |
| 8,020,466 | B2 * | 9/2011 | Inoue et al. ................ | 74/490.02 |
| 8,117,939 | B2 * | 2/2012 | Burlot ........................ | 74/490.02 |
| 8,177,048 | B2 * | 5/2012 | Sato et al. ..................... | 198/619 |

(Continued)

FOREIGN PATENT DOCUMENTS

CN          1666847 A      9/2005
CN        100415431 C      9/2008

(Continued)

OTHER PUBLICATIONS

The extended European search report dated Jan. 5, 2012.

(Continued)

*Primary Examiner* — Justin Krause
*Assistant Examiner* — Gregory Prather
(74) *Attorney, Agent, or Firm* — Bacon&Thomas, PLLC

(57) ABSTRACT

A robot includes a base; a swivel unit rotatably arranged on the base; a lower arm having a base end portion, a tip end portion and a side surface, the base end portion rotatably supported on the swivel unit to enable the lower arm to swing in a front-rear direction; and first and second cable bundles arranged on the side surface of the lower arm to extend along a longitudinal direction of the lower arm. The robot further includes a cable bundle support mechanism including a guide unit for supporting the first and second cable bundles to move in the longitudinal direction of the lower arm.

18 Claims, 7 Drawing Sheets

(56) References Cited

U.S. PATENT DOCUMENTS

| | | | |
|---|---|---|---|
| 8,281,683 B2* | 10/2012 | Garrec et al. | 74/490.02 |
| 8,549,950 B2* | 10/2013 | Lee | 74/490.02 |
| 2004/0103740 A1* | 6/2004 | Townsend et al. | 74/490.01 |
| 2005/0103148 A1* | 5/2005 | Inoue et al. | 74/490.02 |
| 2005/0193854 A1* | 9/2005 | Sanemasa | 74/490.02 |
| 2006/0104791 A1 | 5/2006 | Nihei et al. | |
| 2008/0164382 A1* | 7/2008 | Burlot | 248/74.2 |
| 2008/0302200 A1* | 12/2008 | Tobey | 74/490.02 |
| 2009/0032649 A1* | 2/2009 | Inoue et al. | 248/49 |
| 2009/0166478 A1 | 7/2009 | Choi | |
| 2009/0260473 A1* | 10/2009 | Gosselin | 74/490.05 |
| 2011/0072931 A1* | 3/2011 | Gro et al. | 74/490.02 |
| 2012/0275571 A1* | 11/2012 | Neuber | 378/194 |

FOREIGN PATENT DOCUMENTS

| | | |
|---|---|---|
| DE | 299 08 623 | 7/1999 |
| DE | 201 13 742 | 11/2001 |
| DE | 201 13 950 | 11/2001 |
| DE | 10 2007 056774 | 6/2009 |
| JP | H04-063386 | 5/1992 |
| JP | H06-030386 Y2 | 8/1994 |
| JP | 2001-150382 | 6/2001 |
| JP | 2003-039373 | 2/2003 |
| JP | 2003-039373 A | 2/2003 |
| JP | 2005-342859 | 12/2005 |
| JP | 2006-15360 A | 1/2006 |

OTHER PUBLICATIONS

Office Action issued on Jun. 12, 2012 in corresponding Japan Application No. 2010-208245.

The Chinese Office Action dated Jul. 16, 2014 (w/English translation).

Korean Office Action Dated Apr. 23, 2015 Issued in Corresponding Korean Application No. 10-2011-0092337 and English Translation Thereof.

* cited by examiner

ROBOT

FIELD OF THE INVENTION

The present invention relates to a robot.

BACKGROUND OF THE INVENTION

JP2001-150382A discloses a wiring member guide device capable of preventing a wiring member from interfering with a robot or peripheral devices, reducing wear caused by contact and eventually lessening maintenance of the robot and the wiring member. The wiring member guide device can prolong the lifespan of the robot and the wiring member, and can cut down the running cost.

SUMMARY OF THE INVENTION

In view of the above, the present invention provides a robot capable of prolonging the lifespan of cable bundles.

In accordance with an aspect of the present invention, there is provided a robot including a base; a swivel unit rotatably arranged on the base; a lower arm having a base end portion rotatably supported on the swivel unit, the lower arm being swingable in a front-rear direction; first and second cable bundles arranged on a side surface of the lower arm to extend along a longitudinal direction of the lower arm; and a cable bundle support mechanism including a guide unit for supporting the first and second cable bundles to move in the longitudinal direction of the lower arm.

BRIEF DESCRIPTION OF THE DRAWINGS

The objects and features of the present invention will be apparent from the following description of embodiments, given in conjunction with the accompanying drawings, in which.

DETAILED DESCRIPTION OF THE EMBODIMENTS

For the sake of understanding of the present invention, certain embodiments of the present invention will now be described with reference to the accompanying drawings which form a part thereof. In the respective drawings, it is sometimes the case that those portions having nothing to do with the description are not illustrated.

Figure 1A:
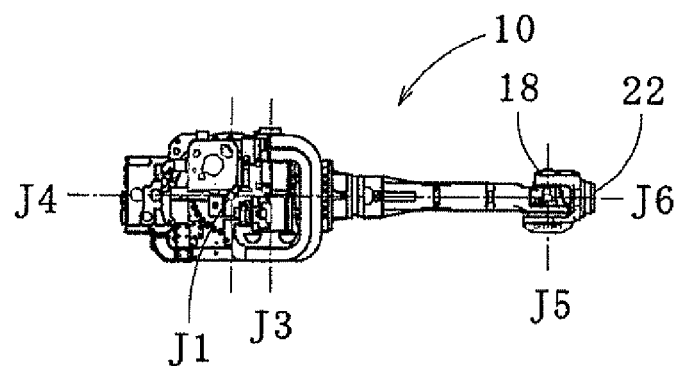
FIGS. 1A, 1B and 1C are plan, side and front views showing a spot welding robot in accordance with a first embodiment of the present invention.
Figure 1B:
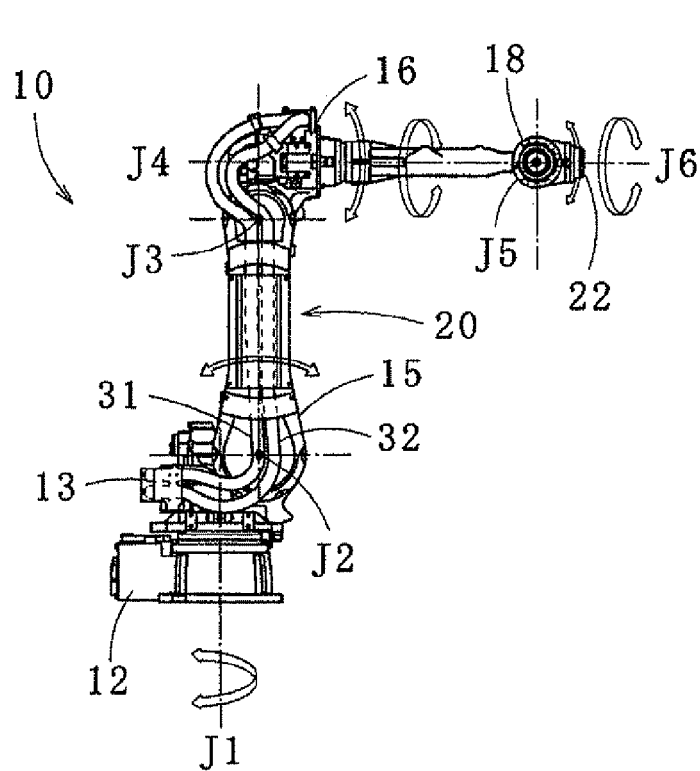
Figure 1C:
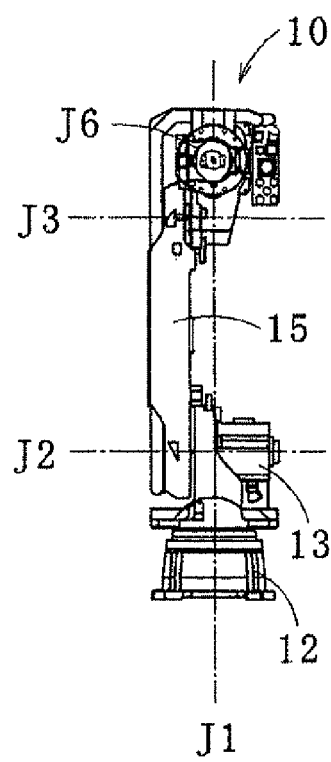

Referring to FIGS. 1A through 1C, a spot welding robot 10 in accordance with a first embodiment of the present invention (which is presented as one example of robots and will be sometimes referred to as "robot" or "welding robot" herein below) is, e.g., a six-axis articulated robot (with joint axes J1 through J6) including a base 12, a swivel unit 13, a lower arm 15, an upper arm 16, a wrist unit 18 and a cable bundle support mechanism 20. The joint axis J1 is arranged to intersect an installation surface on which the spot welding robot 10 is installed. The joint axis J2 is arranged substantially parallel to the installation surface. The joint axis J3 is arranged substantially parallel to the joint axis J2. The joint axis J4 is arranged to intersect the joint axis J1. The joint axis J5 is arranged to intersect the joint axis J4. The joint axis J6 is arranged to intersect the joint axis J5.

The base 12 is fixed to the installation surface for installation of the spot welding robot 10. The swivel unit 13 is rotatably provided on the base 12 and can rotate about the joint axis J1 (swivel axis). The lower arm 15 has a base end portion supported on the swivel unit 13 to be rotatable about the joint axis J2. Thus, the lower arm 15 can swing in the front-rear direction. The upper arm 16 has a base end portion supported on a tip end portion of the lower arm 15 to be rotatable about the joint axis J3. Thus, the upper arm 16 can swing in the up-down direction.

The wrist unit 18 is attached to a tip end portion of the upper arm 16. The wrist unit 18 has a tip end portion rotating about the joint axis J5 substantially parallel to the joint axis J3. The wrist unit 18 can rotate about the joint axis J4 substantially intersecting the joint axis J1. The wrist unit 18 includes a wrist flange 22 arranged in the tip end portion thereof. The wrist flange 22 can rotate about the joint axis J6. A spot welding gun (one example of a welding unit) not shown in the drawings is attached to the wrist flange 22.

First and second cable bundles 31 and 32 are arranged in the spot welding robot 10. The first cable bundle 31 is configured by twisting together, e.g., cables connected to servo motors (not shown) for driving the wrist unit 18 and the upper arm 16 arranged at the tip end portion of the lower arm 15, cables connected to sensors arranged within the spot welding robot 10 and air hoses. The second cable bundle 32 is configured by twisting together, e.g., cables for supplying therethrough an electric current to the spot welding gun arranged in the wrist unit 18, cables connected to sensors and coolant hoses.

Figure 2:
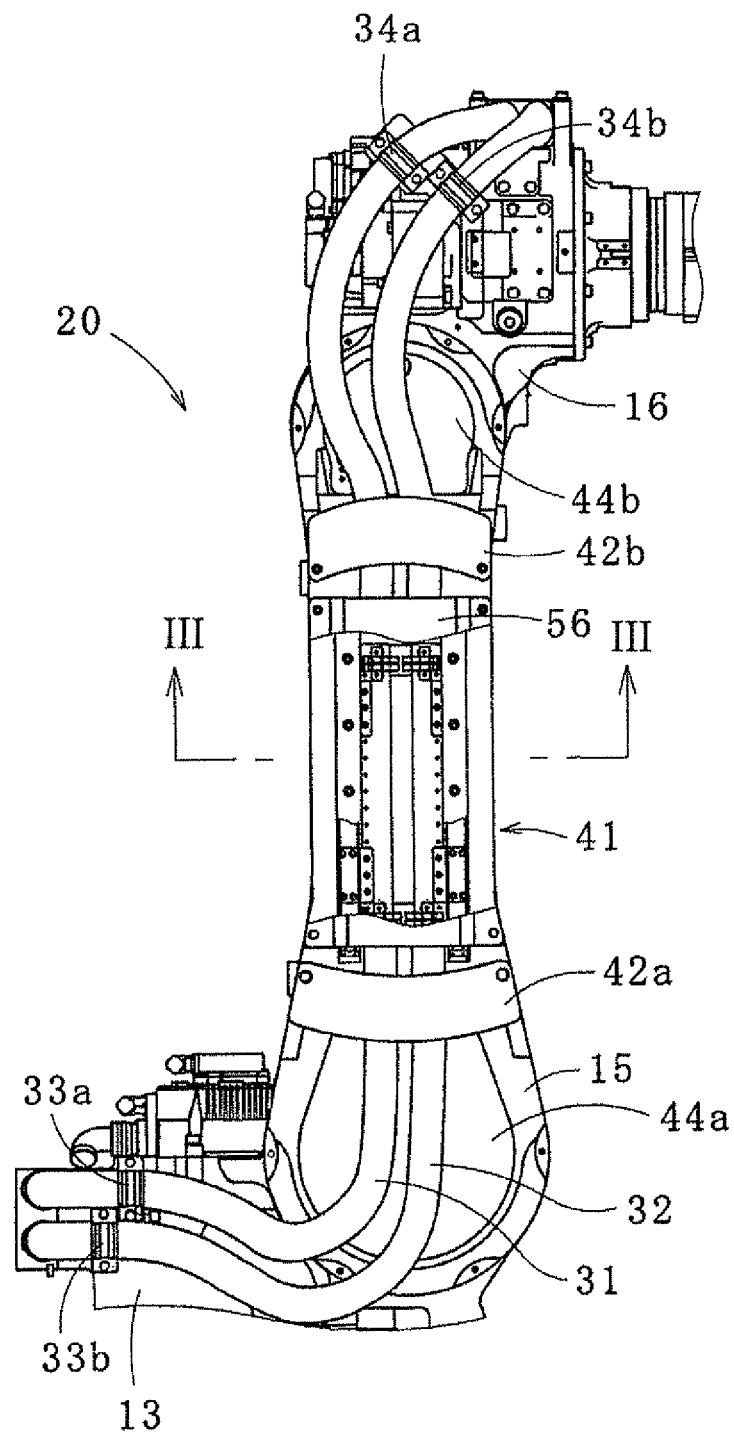
FIG. 2 is an enlarged view of the spot welding robot in accordance with the first embodiment of the present invention.

As shown in FIG. 2, the first cable bundle 31 is fixed in place by a brace 33a arranged in the swivel unit 13 and a brace 34a arranged in the upper arm 16. The second cable bundle 32 is fixed in place by a brace 33b arranged in the swivel unit 13 and a brace 34b arranged in the upper arm 16. The first and second cable bundles 31 and 32 are arranged on a side surface of the lower arm 15 to extend along the longitudinal direction of the lower arm 15. Specifically, if the longitudinal direction of the lower arm 15 is assumed to coincide with the vertical direction, the second cable bundle 32 is arranged at the front side of the first cable bundle 31.

Stating differently, if the longitudinal direction of the lower arm 15 is assumed to coincide with the vertical direction, the first cable bundle 31 extends from the point fixed by the brace 33a in the direction intersecting the longitudinal direction of the lower arm 15. Then, the first cable bundle 31 is curved downwards and extended upwards. Thus, the first cable bundle 31 is arranged on the side surface of the lower arm 15. Subsequently, the first cable bundle 31 is bent upwards on the side surface of the lower arm 15 and is extended toward the upper arm 16. The first cable bundle 31 is fixed to the upper arm 16 by the brace 34a.

The second cable bundle 32 extends from the point fixed by the brace 33b in the direction intersecting the longitudinal direction of the lower arm 15. Then, the second cable bundle 32 is curved downwards and is extended upwards along the outer side of the bent portion of the first cable bundle 31. Thus, the second cable bundle 32 is arranged on the side surface of the lower arm 15. Subsequently, the second cable bundle 32 is bent upwards on the side surface of the lower arm 15 along the inside of the bent portion of the first cable bundle 31 and is extended toward the upper arm 16. The second cable bundle 32 is fixed to the upper arm 16 by the brace 34b. The first and second cable bundles 31 and 32 are covered with, and protected by, a Zipper Tube (registered trademark).

Since the first and second cable bundles 31 and 32 are arranged on the side surface of the lower arm 15, at least one of the first and second cable bundles 31 and 32 does not intersect the joint axis J2. For the same reason, at least one of the first and second cable bundles 31 and 32 does not intersect the joint axis J3.

The cable bundle support mechanism 20 is provided on the side surface of the spot welding robot 10. The cable bundle support mechanism 20 is capable of supporting the first and second cable bundles 31 and 32 so that they can move in the longitudinal direction of the lower arm 15.

Next, the cable bundle support mechanism 20 will be described in detail. As shown in FIG. 2, the cable bundle support mechanism 20 includes a guide unit 41, two pressing plates (examples of pressing members) 42a and 42b and two protector plates (examples of protector members) 44a and 44b.

Figure 3:
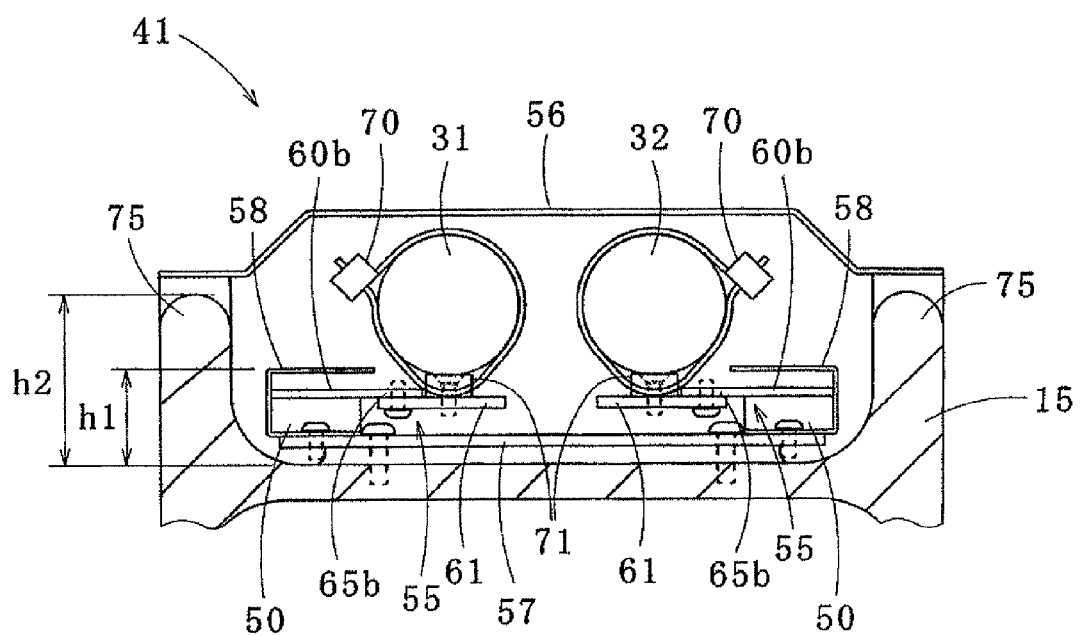
FIG. 3 is a section view taken along line III-III in FIG. 2.
Figure 4:
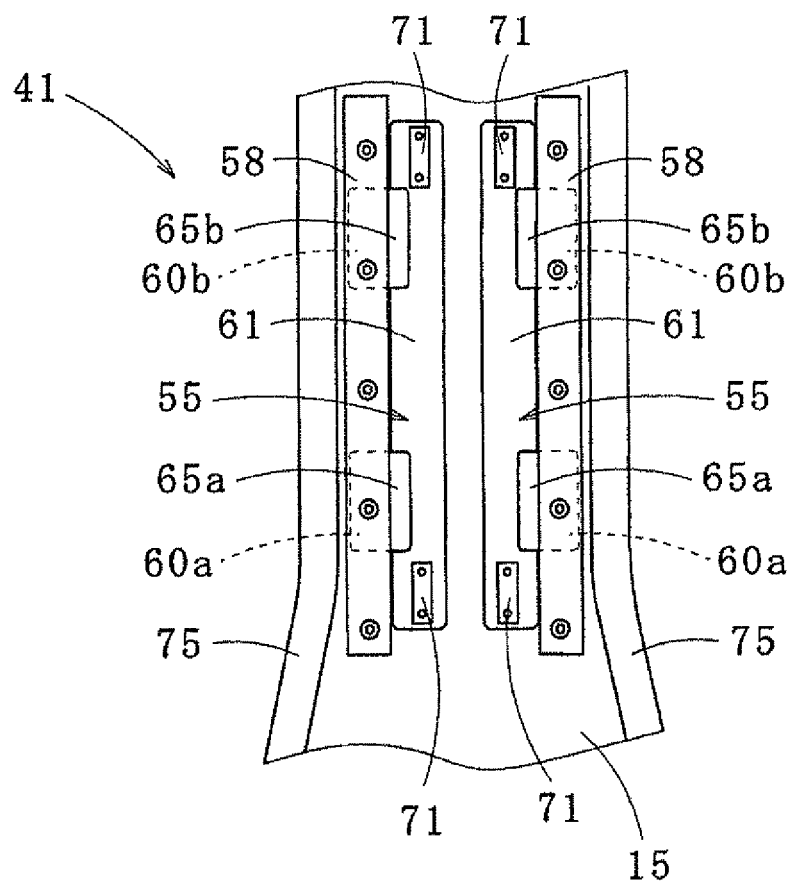
FIG. 4 is a plan view illustrating a guide portion of iner accessory support mechanism provided in a lower arm of the spot welding robot in accordance with the first embodiment of the present invention.

As shown in FIGS. 3 and 4, the guide unit 41 includes a pair of slide rails 50 and a pair of sliders 55 seated on the slide rails 50. The sliders 55 can move in the longitudinal direction of the lower arm 15 independently of each other. The slide rails 50 and the sliders 55 are covered with a cover 56. The sliders 55 have a stroke of, e.g., 100 to 150 mm.

The slide rails 50 extend in the longitudinal direction of the lower arm 15 in a mutually spaced-apart relationship. The slide rails 50 are fixed to a fixing plate 57 which in turn is secured to the lower arm 15. Rail covers 58 for covering the slide rails 50 are arranged above the slide rails 50. Use of the rail covers 58 reduces the possibility that the spatters generated when the spot welding robot 10 performs a welding work adhere to the sliding portions of the slide rails 50.

Each of the sliders 55 includes at least first and second slide members 60a and 60b and a cable bundle holding member 61. The first and second slide members 60a and 60b are arranged at the opposite side to the fixing surface of the corresponding slide rail 50, and slidable on the corresponding slide rail 50. Further, the first and second slide members 60a and 60b are respectively provided with first and second protrusions 65a and 65b protruding beyond one of the slide rails 50 toward the other. The first protrusion 65a is arranged between the longitudinal center of each of the slide rails 50 and the base end portion of the lower arm 15. The second protrusion 65b is arranged between the longitudinal center of each of the slide rails 50 and the tip end portion of the lower arm 15.

Each of the cable bundle holding members 61 is, e.g., a plate-like member extending in the longitudinal direction of each of the slide rails 50. The first and second cable bundles 31 and 32 are respectively fixed to the cable bundle holding members 61. The cable bundle holding members 61 are respectively fixed in place such that the upper surfaces of the cable bundle holding members 61 can make contact with the rear surfaces (the surfaces facing the lower arm 15) of the first and second protrusions 65a and 65b at positions between the longitudinal center of the cable bundle holding member 61, and the base end portion and the tip end portion of the lower arm 15. In other words, when seen in a cross sectional view, each of the cable bundle holding members 61 is fixed to the first and second slide members 60a and 60b underneath the first and second slide members 60a and 60b (see FIG. 3).

In this manner, each of the cable bundle holding members 61 is arranged closer to the lower arm 15 than the outer surfaces (the opposite surfaces from the lower arm 15) of the first and second protrusions 65a and 65b. As compared with a case where each of the cable bundle holding members 61 is fixed in contact with the upper surfaces of the first and second protrusions 65a and 65b, the first and second cable bundles 31 and 32 are respectively fixed to the cable bundle holding members 61 in positions inwardly shifted by the sum of the thickness of the cable bundle holding member 61 and the thickness of the first protrusion 65a (the second protrusion 65b) along the transverse direction of the spot welding robot 10 (sometimes referred to as "transverse direction" herein below). This makes it possible to reduce the transverse dimension of the spot welding robot 10. Each of the cable bundle holding members extending in the longitudinal direction of the slide rails 50 is supported at two points by the first and second protrusions 65a and 65b. Each of the first and second cable bundles 31 and 32 makes surface-to-surface contact with the cable bundle holding member 61.

Braces 71 for fixing bands 70 used to tie up the first and second cable bundles 31 and 32 are respectively provided in the opposite longitudinal end portions of each of the cable bundle holding member 61. As set forth above, each of the cable bundle holding members 61 extends in the longitudinal direction of the slide rails 50 and supports each of the first and second cable bundles 31 and 32 on the surface thereof. Accordingly, each of the first and second cable bundles 31 and 32 is stably supported by the cable bundle holding members 61.

The guide unit 41 is provided between ribs 75 formed along the opposite side edges of the lower arm 15 and is positioned in the longitudinal center area of the lower arm 15. In the guide unit 41, the height h1 of the rail covers 58 measured from the side surface of the lower arm 15 is set to be smaller than the protruding height h2 of the ribs 75 (see FIG. 3). In this manner, the guide unit 41 (excluding the cover 56) is arranged within a recessed portion defined by the ribs 75. This makes it possible to increase the strength of the lower arm 15 while reducing the transverse dimension of the spot welding robot 10.

The pressing plates 42a and 42b (see FIG. 2) are respectively arranged at the longitudinal opposite end sides of the guide unit 41. The pressing plates 42a and 42b are provided to cover the upper surfaces (the surfaces facing transversely outwards in the robot 10) of the first and second cable bundles 31 and 32. The pressing plates 42a and 42b can reduce the transverse deformation of the first and second cable bundles 31 and 32 which may occur when the first and second cable bundles 31 and 32 are guided by the guide unit 41.

The pressing plates 42a and 42b are made of, e.g., a self-lubricating engineering plastic such as a polyacetal resin or a polyimide resin. The upper and lower sides of the pressing plate 42a (the two sides of the pressing plate 42a intersecting the longitudinal direction of the lower arm 15) are curved for the pressing plate 42a to bulge toward the base end portion of the lower arm 15. Likewise, the upper and lower sides of the pressing plate 42b (the two sides of the pressing plate 42b intersecting the longitudinal direction of the lower arm 15)

are curved for the pressing plate 42b to bulge toward the tip end portion of the lower arm 15.

The shape of the pressing plates 42a and 42b is not limited to the one mentioned above. From the viewpoint of reduction of the transverse deformation of the first and second cable bundles 31 and 32, it is desirable that the pressing plates 42a and 42b extend toward the base end portion and the tip end portion of the lower arm 15 to cover the side surface of the lower arm 15 as widely as possible.

The protector plates 44a and 44b are respectively arranged to cover the side surface of the base end portion (the side surface around the joint axis J2) of the lower arm 15 and the side surface of the tip end portion (the side surface around the joint axis J3) of the lower arm 15. The protector plates 44a and 44b are made of, e.g., a self-lubricating engineering plastic such as a polyacetal resin or a polyamide resin. The bent portions of the first and second cable bundles 31 and 32 make contact with the protector plates 44a and 44b. This eliminates the possibility that the first and second cable bundles 31 and 32 make direct contact with, and rub against, the surface of the lower arm 15 made of cast iron. Accordingly, it is possible to reduce damage of the first and second cable bundles 31 and 32.

Next, the operation of the spot welding robot 10 will be described with reference to FIG. 5. As mentioned earlier, at least one of the first and second cable bundles 31 and 32 does not intersect the joint axes J2 and J3. In the following description, it will be assumed that both of the first and second cable bundles 31 and 32 do not intersect the joint axes J2 and J3.

Figure 5C:
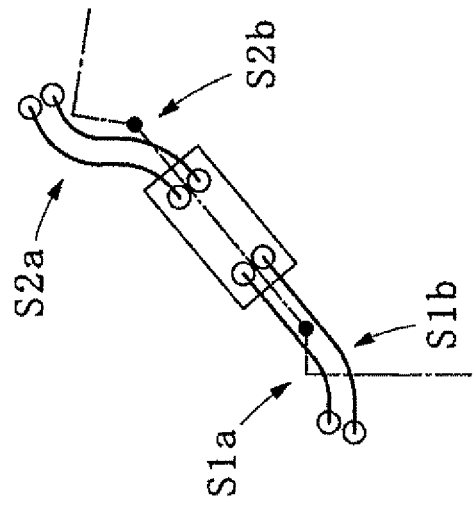
FIGS. 5A, 5B and 5C are explanatory views schematically illustrating the motions of first and second cable bundles depending on the postures of the spot welding robot in accordance with the first embodiment of the present invention.
Figure 5B:
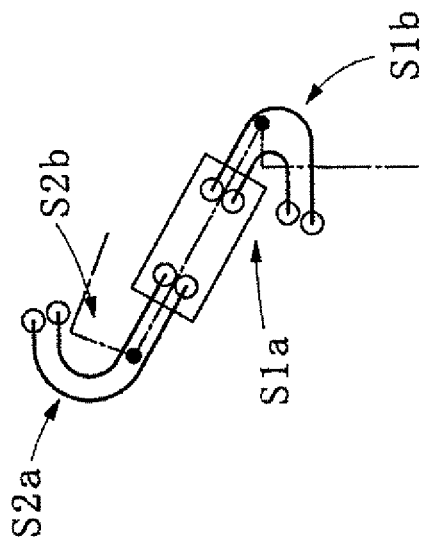
Figure 5A:
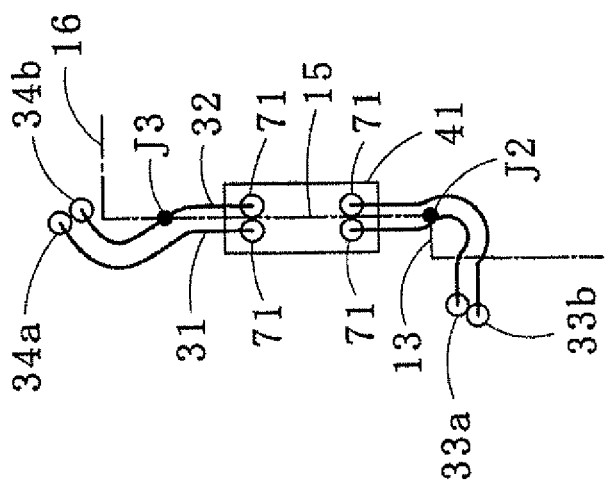

In FIGS. 5A through 5C, the single-dotted chain line indicates the lower arm 15 and the upper arm 16 of the spot welding robot 10, the symbol "●" indicates the joint axes J2 and J3 of the spot welding robot 10, the thick solid lines indicates the first and second cable bundles 31 and 32, and the symbol "○" indicates the fixing points (or the braces) of the first and second cable bundles 31 and 32.

FIG. 5A shows a reference posture (the posture shown in FIG. 1B) in which the longitudinal direction of the lower arm 15 coincides with the vertical direction. In this posture, no strong external force is applied to the first and second cable bundles 31 and 32.

As shown in FIG. 5B, if the lower arm 15 is tilted backwards from the reference posture and if the upper arm 16 is rotated about the joint axis J3 so that the tip end portion thereof can face downwards, the extension length of the first cable bundle 31 becomes short in the section Sla between the brace 33a and the brace 71 and, thus, a first force slackening the first cable bundle 31 acts on the first cable bundle 31. The extension length of the first cable bundle 31 becomes long in the section S2a between the brace 34a and the brace 71 and, thus, a second force tightening the first cable bundle 31 acts on the first cable bundle 31. However, the first and second forces acting on the first cable bundle 31 are weakened as the slider 55 arranged in the cable bundle support mechanism 20 (the guide unit 41) to support the first cable bundle 31 is moved toward the tip end portion of the lower arm 15.

On the other hand, the extension length of the second cable bundle 32 becomes long in the section S1b between the brace 33b and the brace 71 and, thus, a third force tightening the second cable bundle 32 acts on the second cable bundle 32. The extension length of the second cable bundle 32 becomes short in the section S2b between the brace 34b and the brace 71 and, thus, a fourth force slackening the second cable bundle 32 acts on the second cable bundle 32. However, the third and fourth forces acting on the second cable bundle 32 are weakened as the slider 55 arranged in the cable bundle support mechanism 20 (the guide unit 41) to support the second cable bundle 32 is moved toward the base end portion of the lower arm 15.

As shown in FIG. 5C, if the lower arm 15 is tilted forwards from the reference posture and if the upper arm 16 is rotated about the joint axis J3 so that the tip end portion thereof can face upwards, the extension length of the first cable bundle 31 becomes long in the section S1a between the brace 33a and the brace 71 and, thus, a fifth force tightening the first cable bundle 31 acts on the first cable bundle 31. The extension length of the first cable bundle 31 becomes short in the section S2a between the brace 34a and the brace 71 and, thus, a sixth force slackening the first cable bundle 31 acts on the first cable bundle 31. However, the fifth and sixth forces acting on the first cable bundle 31 are weakened as the slider 55 arranged in the cable bundle support mechanism 20 (the guide unit 41) to support the first cable bundle 31 is moved toward the base end portion of the lower arm 15.

On the other hand, the extension length of the second cable bundle 32 becomes short in the section S1b between the brace 33b and the brace 71 and, thus, a seventh force slackening the second cable bundle 32 acts on the second cable bundle 32. The extension length of the second cable bundle 32 becomes long in the section S2b between the brace 34b and the brace 71 and, thus, an eighth force tightening the second cable bundle 32 acts on the second cable bundle 32. However, the seventh and eighth forces acting on the second cable bundle 32 are weakened as the slider 55 arranged in the cable bundle support mechanism 20 (the guide unit 41) to support the second cable bundle 32 is moved toward the tip end portion of the lower arm 15.

It is sometimes the case that, along with the movement of the sliders 55, the first cable bundle 31 or the second cable bundle 32 rubs against the pressing plates 42a and 42b and the protector plates 44a and 44b. Even if such is the case, it is possible to reduce damage of the first and second cable bundles 31 and 32 because the pressing plates 42a and 42b and the protector plates 44a and 44b are made of a self-lubricating engineering plastic.

Next, description will be given on a spot welding robot 80 in accordance with a second embodiment of the present invention. The same components as those of the spot welding robot 10 in accordance with the first embodiment will be designated by like reference symbols and will not be described in detail. The spot welding robot 80 of the present embodiment differs from the above-described spot welding robot 10 in that the spot welding robot 80 further includes first and second support members 81a and 81b.

Figure 6:
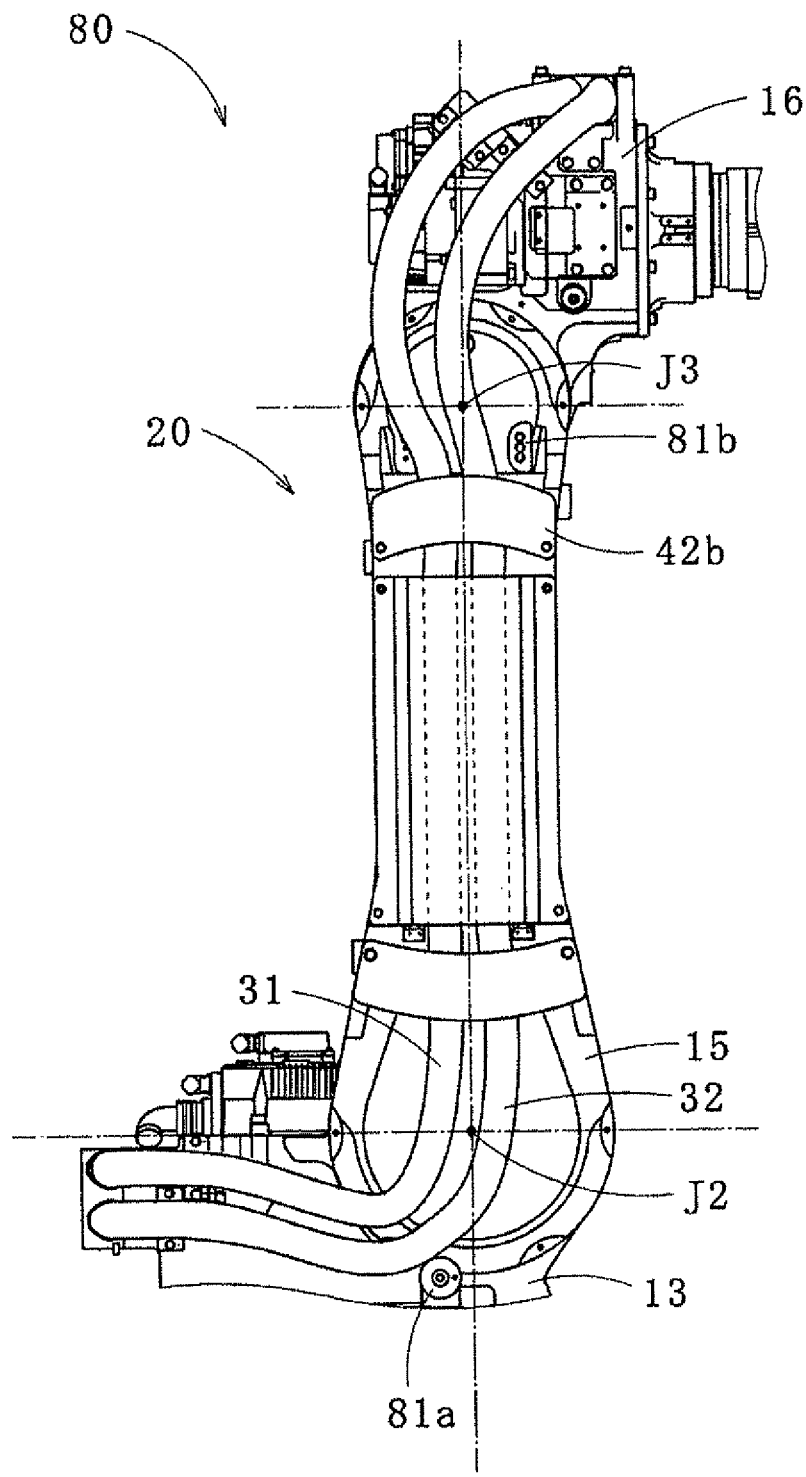
FIG. 6 is a side view showing a spot welding robot in accordance with a second embodiment of the present invention.

As shown in FIG. 6, the first support member 81a is fixed to a side portion of the swivel unit 13 through a bracket. The first support member 81a has, e.g., cylindrical columnar shape, and is provided such that a lower surface thereof makes contact with the side portion of the swivel unit 13. When the spot welding robot 80 is seen from one side thereof, the first support member 81a is arranged at the rear lower side of the joint axis J2 about which the lower arm 15 is rotated. Moreover, the first support member 81a is arranged in the border between the lower arm 15 and the swivel unit 13.

The bent portion of the second cable bundle 32 makes contact with the outer circumferential surface of the first support member 81a. The first support member 81a is made of, e.g., a self-lubricating engineering plastic such as a polyacetal resin or a polyamide resin.

The second support member 81b is provided in the tip end portion of the lower arm 15 at the same side surface of the lower arm 15 as the side surface on which the first support member 81a is arranged. When seen in a plan view, the second support member 81b having curved edges.

The second support member 81b is arranged at the tip end side of the lower arm 15 with respect to the pressing plate 42b. When the spot welding robot 10 is seen from one side thereof in a state that the longitudinal direction of the lower arm 15 coincides with the vertical direction, the second support member 81b is arranged at the front lower side of the joint axis J3 about which the upper arm 16 is rotated. The second support member 81b is made of, e.g., a self-lubricating engineering plastic such as a polyacetal resin or a polyamide resin.

Figure 7:
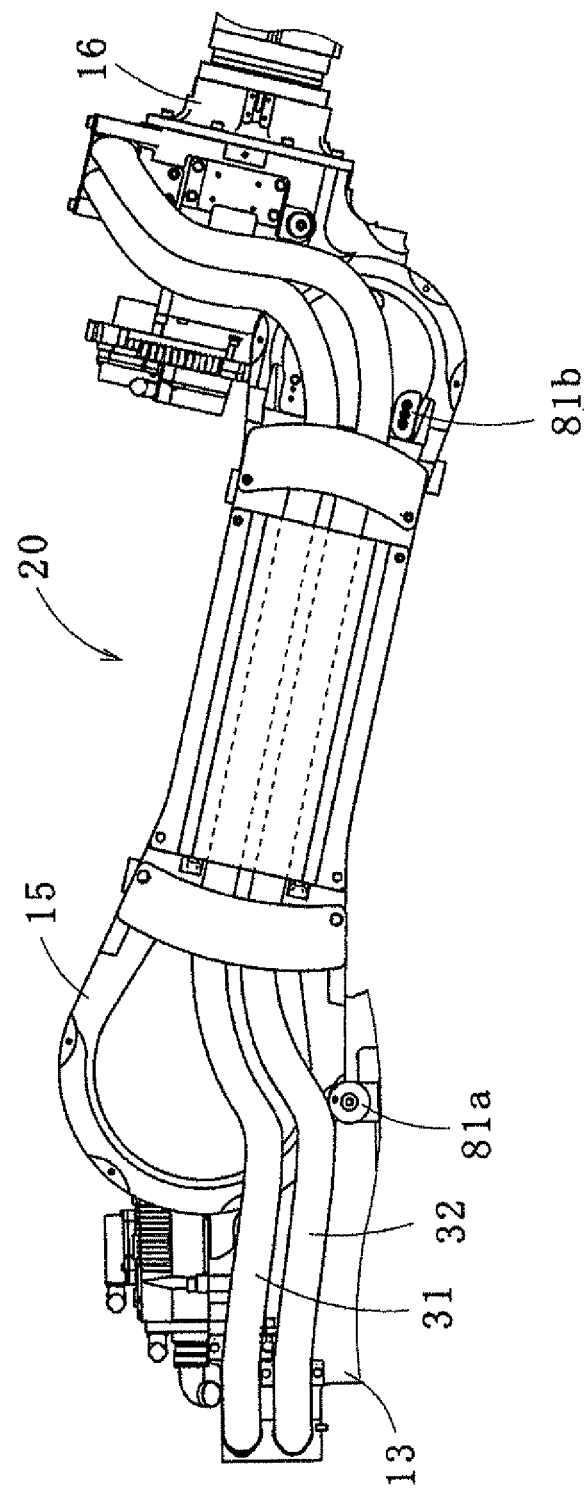
FIG. 7 is a side view depicting a state that the spot welding robot in accordance with the first embodiment of the present invention is tilted forwards.

Referring to FIG. 7, if the lower arm 15 is tilted forwards and if the upper arm 16 is rotated about the joint axis J3 so that the tip end portion thereof can face upwards, the bent portions of the second cable bundle 32 are supported by the first and second support member 81a and 81b. As a result, the second cable bundle 32 is prevented from hanging down. Damage of the first and second cable bundles 31 and 32 is reduced because the first and second support member 81a and 81b are made of a self-lubricating engineering plastic.

The present invention is not limited to the embodiments described above but may be modified without departing from the spirit and scope of the invention. For instance, the foregoing embodiment and other modifications may be combined partly or in their entirety. These combinations shall be construed to fall within the scope of the present invention.

In particular, it is apparent that the present invention may be embodied by exchanging the positions of the first and second cable bundles 31 and 32. In this case, the first and second support member 81a and 81b serve to prevent the first cable bundle 31 from hanging down.

What is claimed is:

1. A robot, comprising:
   a base;
   a swivel unit rotatably arranged on the base;
   a lower arm having a base end portion rotatably supported on the swivel unit, the lower arm being swingable in a front-rear direction;
   a first cable bundle and a second cable bundle which are arranged on a side surface of the lower arm to extend along a longitudinal direction of the lower arm; and
   a cable bundle support mechanism including a guide unit for supporting the first cable bundle and the second cable bundle to move in the longitudinal direction of the lower arm, the guide unit including one or more sliders movable in the longitudinal direction of the lower arm and a pair of slide rails extending along the longitudinal direction of the lower arm in a spaced-apart relationship with each other,
   wherein the lower arm includes ribs respectively formed to extend along opposite edges of the lower arm when seen in a side view such that a recessed portion is defined therebetween,
   wherein the guide unit is arranged within the recessed portion between the ribs and is positioned in a longitudinal center area of the lower arm, and
   wherein the slide rails are covered with rail covers and a height of the rail covers measured from the side surface of the lower arm is set to be smaller than a protruding height of the ribs.

2. The robot of claim 1, further comprising:
   an upper arm provided at a tip end of the lower arm;
   a wrist unit provided at a tip end portion of the upper arm; and
   servo motors for driving the upper arm and the wrist unit, the first cable bundle including a cable for supplying therethrough an electric current to the servo motors, the second cable bundle including a cable for supplying therethrough a welding current to a welding unit provided at the wrist unit.

3. The robot of claim 1,
   wherein the number of the sliders is greater than one and a pair of said sliders are seated on the slide rails to move in the longitudinal direction of the lower arm independently of each other, and
   wherein the first cable bundle is fixed to one of the pair of said sliders and the second cable bundle is fixed to the other of said sliders.

4. The robot of claim 3, wherein each of the pair of said sliders includes a first protrusion and a second protrusion which protrude beyond one of the slide rails toward the other; and a cable bundle holding member secured to the first protrusion and the second protrusion, and
   wherein the first cable bundle and the second cable bundle are fixed to the cable bundle holding member of one of the pair of said sliders and the cable bundle holding member of the other, respectively.

5. The robot of claim 4, wherein each of the cable bundle holding members is arranged to extend in a longitudinal direction of the corresponding slide rail, and is secured to the first protrusion and the second protrusion at positions between the longitudinal center portion of the corresponding slide rail, and the base end portion and a tip end portion of the lower arm.

6. The robot of claim 4, wherein each of the cable bundle holding members is arranged closer to the lower arm than the outer surface of the first protrusion and the second protrusion.

7. The robot of claim 1, wherein the cable bundle support mechanism further includes two separated pressing members directly fixed to the lower arm not through the sliders, the pressing members being configured to reduce transverse deformation of the first cable bundle and the second cable bundle caused by movement of the first cable bundle and the second cable bundle.

8. The robot of claim 1, wherein the cable bundle support mechanism further includes two protector members that cover side surfaces of the base end portion and a tip end portion of the lower arm to protect the first cable bundle and the second cable bundle.

9. The robot of claim 7, wherein the pressing members are made of a self-lubricating engineering plastic.

10. The robot of claim 8, wherein the protector members are made of a self-lubricating engineering plastic.

11. The robot of claim 1, wherein one of the first cable bundle and the second cable bundle is arranged forward of the other when the longitudinal direction of the lower arm coincides with a vertical direction, and
    wherein the cable bundle support mechanism further includes:
    a first support member fixed to a side portion of the swivel unit to prevent the forwardly arranged cable bundle from hanging down; and
    a second support member fixed to a side surface of a tip end portion of the lower arm to prevent the forwardly arranged cable bundle from hanging down.

12. The robot of claim 11, wherein the first support member and the second support member are made of a self-lubricating engineering plastic.

13. The robot of claim 3, wherein the sliders are configured to slide by tension force of the first cable bundle and the second cable bundle, respectively.

14. The robot of claim 11, wherein the first support member and the second support member are configured such that the forwardly arranged cable bundle is supported by or detached from the first support member and the second support member without being fixed thereto.

15. The robot of claim 12, wherein at least one of the first support member and the second support member has an outer surface including a convex portion configured to be in contact with the forwardly arranged cable bundle when said one of the first support member and the second support member supports the forwardly arranged cable bundle.

16. The robot of claim 15, wherein the convex portion and the forwardly arranged cable bundle are arranged such that the convex portion protrudes toward the forwardly arranged cable bundle.

17. The robot of claim 15, wherein the convex portion and the forwardly arranged cable bundle are arranged such that the forwardly arranged cable bundle extends along a curve of the convex portion.

18. The robot of claim 1, further comprising:
   an upper arm rotatably supported at a tip end of the lower arm; and
   a wrist unit provided at a tip end portion of the upper arm,
   wherein the first cable bundle and the second cable bundle are arranged to extend between the swivel unit and the upper arm.

\* \* \* \* \*